US005608596A

United States Patent [19]

Smith et al.

[11] Patent Number: 5,608,596

[45] Date of Patent: Mar. 4, 1997

[54] SURGE ARRESTER WITH SPRING CLIP ASSEMBLY

[75] Inventors: Robert W. Smith, Hinsdale; Michael G. Marvin; Deborah L. Limburg, both of Olean, all of N.Y.; Stanley S. Kershaw, Jr., Waukesha, Wis.; Robert N. Schettler, Olean, N.Y.; Gary L. Goedde, Racine, Wis.

[73] Assignee: Cooper Power Systems, Inc., Coraopolis, Pa.

[21] Appl. No.: 428,642

[22] Filed: Apr. 25, 1995

Related U.S. Application Data

[63] Continuation of Ser. No. 906,761, Jun. 30, 1992, abandoned, which is a continuation-in-part of Ser. No. 598,267, Oct. 16, 1990, Pat. No. 5,220,480.

[51] Int. Cl.⁶ .......... H02H 1/00

[52] U.S. Cl. .......... 361/118; 361/56; 361/91; 361/111

[58] Field of Search .......... 361/56, 91, 118, 361/119, 127, 124, 120, 111

[56] References Cited

U.S. PATENT DOCUMENTS

| | | | |
|---|---|---|---|
| 3,778,743 | 2/1973 | Matsuoka et al. | 338/20 |
| 4,233,641 | 4/1979 | Baumbach | 361/119 |
| 4,240,124 | 12/1980 | Westrom | 361/127 |
| 4,320,436 | 3/1982 | Bushnell | 361/128 |
| 4,345,290 | 8/1982 | Johnson | 361/56 |
| 4,439,807 | 3/1984 | Reitz | 361/127 |
| 4,604,673 | 8/1986 | Schoendube | 361/38 |
| 4,803,588 | 2/1989 | Bzdak | 361/118 |
| 4,809,124 | 2/1989 | Kresge | 361/58 |

OTHER PUBLICATIONS

General Electric Publication, "TRANQUELL Secondary Arrester Protect Your Electrical Equipment Against Damage by Lightning" (1983).

General Electric Publication, "Home Lightning Protector" (1972).

McGraw Edison Publication, "Surge Arresters, Storm Trapper Secondary Voltage Arresters" (1980).

*Primary Examiner*—Jeffrey A. Gaffin
*Assistant Examiner*—Stephen W. Jackson
*Attorney, Agent, or Firm*—Gregory L. Maag; Conley, Rose & Tayon, P.C.

[57] ABSTRACT

A surge arrester particularly suited for secondary side protection of distribution transformers, includes a low-voltage, high-energy varistor disk having electrodes disposed about its facing surfaces and a self-compressing spring clip with spring arms disposed about the varistor to provide the compressive force necessary to maintain good electrical contact between the electrodes and the varistor. The arrester includes terminals for electrically interconnecting the electrodes with the electrical apparatus being protected by the arrester. The arrester further includes a dielectric coating substantially enveloping the varistor, the spring clip and electrodes. The arrester requires no other housing. The spring arms may be made in a variety of configurations and shapes and may be interlaced with adjacent spring clip and varistor subassemblies so as to form three-phase or other multi-pole arresters. A particular preferred embodiment of a multi-pole arrester includes two or more varistors and a spring clip having a central base member and two spring arms. The spring arms form lobes disposed one on either side of the base member, and the base member and spring arms are all integrally formed from a single piece of material.

59 Claims, 11 Drawing Sheets

SURGE ARRESTER WITH SPRING CLIP ASSEMBLY

This is a file wrapper continuation application of prior U.S. patent application Ser. No. 07/906,761 filed on Jun. 30, 1992, now abandoned, which is a continuation-in part application of Ser. No. 07/598,267 filed Oct. 16, 1990, now U.S. Pat. No. 5,220,480.

FIELD OF THE INVENTION

The present invention relates generally to surge arresters, and in particular to surge arresters employing voltage dependent varistors. More particularly, the invention relates to an arrester for protecting distribution transformers from damage which may arise from lightning-induced surge currents entering the secondary windings from the transformer's low voltage side. Still more particularly, the invention relates to a low voltage, high energy, ruggedly constructed surge arrester having varistors which are retained in position by means of a spring clip.

BACKGROUND OF THE INVENTION

Under normal operating conditions, electrical transmission and distribution equipment is subject to voltages within a fairly narrow range. Due to lightning strikes, switching surges or other system disturbances, portions of the electric system may experience momentary or transient voltage levels that greatly exceed the levels experienced by the equipment during normal operating conditions. Left unprotected, critical and costly equipment such as transformers, switching apparatus, and electrical machinery may be damaged or destroyed by such overvoltages and the resultant current surges. Accordingly, it is routine practice within the electrical industry to protect such apparatus from dangerous overvoltages through the use of surge arresters.

A surge arrester is commonly connected in parallel with a comparatively expensive piece of electrical equipment so as to shunt or divert the overvoltage-induced current surges safely around the equipment, thereby protecting the equipment and its internal circuitry from damage. When caused to operate, a surge arrester forms a current path to ground having a very low impedance relative to the impedance of the equipment that it is protecting. In this way, current surges which would otherwise be conducted through the equipment are instead diverted through the arrester to ground. Once the transient condition has passed, the arrester must operate to open the recently-formed current path to ground and again isolate or "reseal" the distribution or transmission circuit in order to prevent the nontransient current of the system frequency from "following" the surge current to ground, such system frequency current being known as "power follow current." If the arrester did not have this ability to interrupt the flow of power follow current, the arrester would operate as a short circuit to ground, forcing protective relays and circuit breaker devices to open or isolate the now-shorted circuit from the electrical distribution system, thus causing inconvenient and costly outages.

Distribution transformers convert primary, high voltage levels, such as 2.4 to 34.5 KV, to secondary, low voltage levels, low voltage typically being defined as 1200 volts and less. Distribution transformers include primary and secondary windings which are enclosed in a protective metallic housing. A typical, secondary side voltage level for distribution transformers is 120 volts. Dual secondary side voltages such as 120/240 volts or 240/480 volts are also typical.

A dual secondary voltage, such as 120/240 volts, is achieved by constructing the transformer secondary winding in two halves or sections. One end of each of the two winding sections is electrically joined at a predetermined point and typically grounded at this point of interconnection. In this configuration, when the transformer is energized, the voltage between the grounded interconnection point and each line potential terminal will be the same, i.e., 120 volts, and will be equal to one half the voltage between the two ungrounded ends, i.e., 240 volts.

The primary or high voltage terminals of single phase distribution transformers are conventionally designated as the $H_1$ and $H_2$ bushings. The low voltage or secondary side line-potential terminals for these single phase transformers are designated as $X_1$ and $X_2$, while the low voltage grounded neutral bushing or terminal is designated as $X_0$. For three-phase transformers, the primary terminals are conventionally referred to as the $H_1$, $H_2$ and $H_3$ bushings, while the secondary line-potential terminals are designated as $X_1$, $X_2$ and $X_3$. The neutral bushing on transformers employing a grounded neutral is usually designated $X_0$.

The majority of distribution transformers are designed for pole mounting; however, some are built for pad or platform mounting. Regardless of mounting type, distribution transformers are susceptible to damage from lightning induced surges entering their windings. When a lightning surge occurs, the voltage appearing across the primary winding may exceed the insulation strength of the winding, resulting in a flash-over across or through the winding insulation, thereby causing the transformer to fail. It has been conventional practice to provide overvoltage protection for distribution transformers by means of surge arresters applied to the primary, high voltage winding. More specifically, in the case of single phase distribution transformers in which both primary bushings $H_1$ and $H_2$ are at line potential, surge arresters have typically been connected between $H_1$ and ground and between $H_2$ and ground. In applications in which primary bushing $H_1$ is at line potential and $H_2$ is grounded, it is common to connect a single surge arrester between $H_1$ and grounded $H_2$. The surge arrester's function is to provide a path by which lightning induced current is diverted to ground, thus preventing flashover of the transformer's winding insulation.

Investigations have been made in recent years concerning lightning induced failures of common designs of overhead and pad mounted distribution transformers. These investigations revealed that despite the presence of state-of-the-art primary-side lightning protection as described above, many such transformer failures are attributable to lightning induced surges entering the transformer via the normally unprotected low voltage terminals, causing failure of the high voltage winding due to the induced voltages. While lightning induced currents entering the low voltage bushings are normally non-destructive, current surges over 5,000 amps are not uncommon. Secondary surges in the order of 3,000 amps can result in potentially destructive induced voltages in the primary winding which may cause the transformer to fail. Thus, it has been determined that primary side arrester protection of the high voltage winding is ineffective in preventing transformer damage due to lightning induced surge currents injected in the secondary windings.

In an effort to protect distribution transformers from such secondary-side surges, various schemes have been employed. First, constructing the transformers with interlaced secondary windings provides good protection from three-wire surges; however, two of the most common types of secondary surges result in two-wire surge injection and interlaced windings offer no protection from such surges. Further, transformers having interlaced windings also are more expensive than those with non-interlaced windings.

Alternatively, or additionally, extra primary winding insulation may be added to provide some protection from both two and three-wire surge injection. This technique is relatively expensive, however, and does not prevent surges from entering the transformer, but merely serves to raise the damage threshold level of the transformer.

Recently, surge arresters of the metal oxide varistor (MOV) type have been applied between the secondary-side phase terminals, $X_1$, $X_2$ and $X_3$, and the grounded neutral terminal, $X_0$. MOV disks are variable resistors which provide either a high or a low impedance current path through the disk's body depending on the voltage that appears across the MOV disk. More specifically, at the power system's steady state or normal operating voltage, the MOV disk has a relatively high impedance. As the applied voltage is increased, gradually or abruptly, the impedance of the MOV disk progressively decreases until the voltage appearing across the disk reaches the disk's "breakdown" or "turn-on" voltage, at which point the disk's impedance dramatically decreases and the disk becomes highly conductive. Accordingly, if the arrester is subjected to an abnormally high transient overvoltage, such as may result from a lightning strike or power frequency overvoltage, the MOV disk becomes highly conductive and serves to conduct the resulting transient current to ground. As the transient overvoltage and resultant current dissipate, the MOV disk's impedance once again increases, restoring the arrester and the electrical system to their normal, steady state condition.

MOV type secondary surge arresters have been shown to provide adequate two and three wire surge protection for low energy surges of, for example, 10,000 amps or less. Some manufacturers of such arresters claim their arresters are capable of safely dissipating surges of 20,000 amps. However, to date, such MOV secondary arresters have not had the even higher energy discharge capability desirable.

Further, state-of-the-art MOV secondary surge arresters are expensive to manufacture. For example, U.S. Pat. No. 4,809,124 assigned to General Electric Company, describes a high energy, low voltage surge arrester employing MOV disks having a thickness of 0.115 inches and a diameter of 3 inches. With these and even thicker MOV disks, precise and expensive machining is required to provide a relatively flat and uniform contact surface on the MOV disks. Adding to the manufacturing expense is the fact that the MOV disks typically require that an insulative collar be attached around the circumference of the disk to prevent flashover from one facing surface of the disk to the other.

Additionally, some type of housing has traditionally been required to house and support the MOV disks, electrodes and other components which comprise the arrester. Furthermore, to insure consistent and predictable operation of the arrester, a spring, typically a coil spring or a bellville-type washer, has been required within the arrester to impart the force that is required to maintain good electrical contact between the MOV disks, electrodes and other internal components. Besides providing protection and support, the arrester housing has traditionally also been required in order to provide the reactive force necessary for the spring to function for its intended purpose. Although not specifically directed to low voltage, secondary applications, U.S. Pat. No. 4,240,124 assigned to Kearney-National, Inc. depicts in FIG. 1 a typical spring/housing configuration designed to impart an axial force on a stack of varistors. The requirements dictated by the spring and housing complicate the manufacturing and assembly process and lead to additional costs.

Accordingly, there remains a need in the industry for a low voltage surge arrester capable of protecting a distribution transformer from damage or destruction caused by surge currents that are injected into the secondary windings. Preferably, such an arrester would be of the MOV type and would be durable, rugged and be of a low cost construction. Preferably, the MOV disks would be collarless and would not require extensive machining after the disks are fired. The arrester should be suitable for installation in under-oil applications, such as within the transformer tank or enclosure. Preferably, such an arrester would be effective against high magnitude, short duration surges of 40,000 amps or more. Ideally, the arrester would not require a housing to insulate or protect the arrester components or to provide a reaction force for an internal spring. In fact, it would be preferable if such an arrester could be manufactured with a reliable means for maintaining electrical connection between the MOV disks, electrodes and other internal components which did not depend upon a conventional spring and housing to supply the compressive force necessary.

Other objects and advantages of the present invention will become apparent from the following description.

SUMMARY OF THE INVENTION

There is provided herein a low-cost, durable and ruggedly constructed surge arrester particularly suited for low voltage applications, and in particular, for use on the secondary side of distribution transformers. The invention includes one or more voltage dependent, nonlinear resistors, preferably metal oxide varistor (MOV) disks, having electrodes contacting the facing surfaces of the MOV disks and a self-compressing spring clip for applying a compressive force to insure that the electrodes remain in contact with the facing surface of the MOV disk. The spring clip, which may be made of an insulating or conducting material, includes a pair of spring arms disposed about the MOV disk, the spring arms applying the necessary compressive force without relying upon an arrester housing. In one preferred embodiment, the spring arms supply at least two pounds of force. The arrester may include a dielectric coating which substantially envelopes the varistor, the spring clip and the electrodes, in which case the MOV disk may be manufactured without a dielectric collar. It is preferred that the MOV disk and the arrester have a high-current-short-duration capability of approximately 40,000 amps or more. The invention may include a common electrode formed of a flat conducting member which engages two or more MOV disks and which includes an aperture for mounting the electrode on a transformer bushing stud.

The spring clip may be formed from a ribbon-like strip of material and may include spring arms having a variety of shapes and configurations. For example, the spring arms may comprise arcuate segments of the ribbon material joined together such that the spring clip comprises a lobe. The spring arms may comprise S-shaped curved segments and may be interlaced with similarly shaped spring arms of adjacent MOV disk and spring clip assemblies so as to form a three-phase or other multi-pole surge arrester. In a three-phase embodiment, the spring clips are made of a conducting material and form a common electrode in contact with a facing surface of three MOV disks which are retained in a columnar fashion by the spring arms. One or more spring arms may include an extending tab forming a spade connector for slidingly receiving an electrical terminal.

Also provided is a spring clip having a double lobe that is particularly suited for use in an arrester for three-phase transformers or transformers having dual secondary side voltages. In this embodiment, the spring clip includes a base member and a first and second lobe attached to the base member. Each lobe includes a spring arm having a contact surface spaced apart a predetermined distance from the base member. Depending upon the particular application, one or more varistors are disposed between each contact surface and the base member. In the preferred embodiment, the spring arms and base member are all integrally formed from a single piece of conducting material. Electrodes are disposed between the varistors and the spring arms, the electrodes including terminals used to electrically connect the electrodes to the transformer windings or other equipment being protected. The spring clip may be made of a conducting material and insulative membranes may be placed between some of the varistors and between the spring arms and their adjacent electrodes such that the spring clip forms a common electrode and electrically interconnects the facing surfaces of three varistors so as to form a unique three-phase, low-voltage, high-energy surge arrester.

Thus, the present invention comprises a combination of features and advantages which enable it to substantially advance surge arrester and transformer technology by providing a high-energy, low-voltage surge arrester which can be manufactured at low cost. The arrester is durable and may be applied in a variety of applications, such as under-oil or above oil. The invention may be manufactured without a housing and with varistor disks that are left uncollared. These and various other characteristics and advantages of the present invention will be readily apparent to those skilled in the art on reading the following detailed description and referring to the accompanying drawings.

BRIEF DESCRIPTION OF THE DRAWINGS

For a detailed description of the preferred embodiments of the invention, reference will now be made to the accompanying drawings wherein.

DESCRIPTION OF THE PREFERRED EMBODIMENT

Surge arresters are installed in electrical systems for the purpose of diverting dangerous overvoltage-induced surges to ground and preventing such surges from damaging costly or critical electrical equipment. The present invention relates in general to any type of electrical apparatus which may be protected by surge arresters, such apparatus including transformers, electrical switching devices and a variety of other electrical apparatus. For purposes of example only, and not by way of limiting the scope of the invention in any way, the present invention will be described with reference to the invention's application on the secondary or low-voltage side of distribution transformers.

Figure 1:
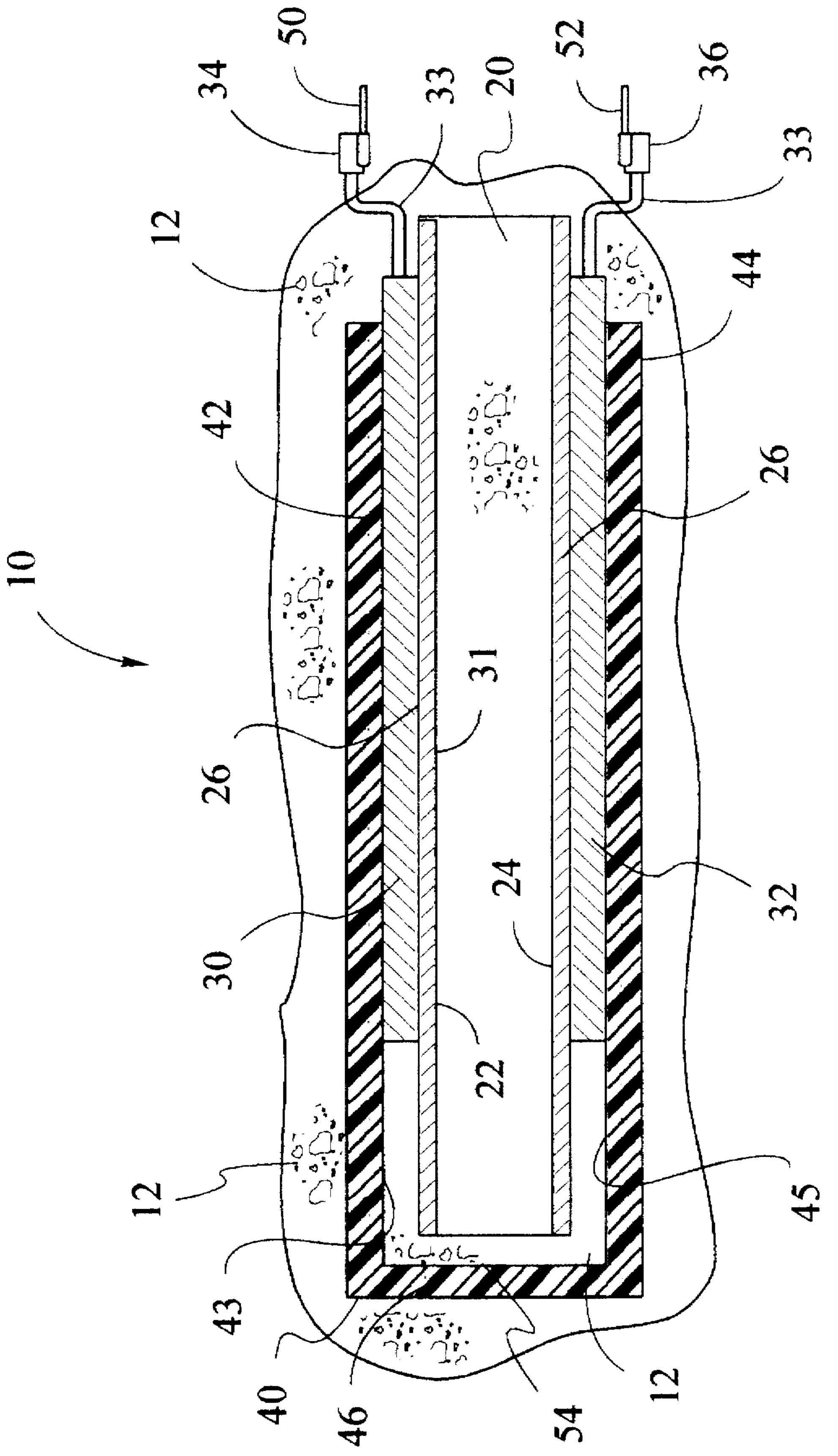
FIG. 1 shows a cross-sectional view of the surge arrester and spring clip assembly of the present invention.

Referring initially to FIG. 1, there is shown surge arrester 10 structured in accordance with the principles of the present invention. As shown, arrester 10 generally comprises metal oxide varistor disk 20, electrodes 30, 32, terminals 34, 36, and self-compressing spring clip 40.

Metal oxide varistor (MOV) disk 20 is a voltage dependent, nonlinear resistor made of metal oxide and preferably is formed into a short cylindrical disk having an upper facing surface 22 and a lower facing surface 24. MOV disk 20 must be capable of withstanding high energy surge currents. The metal oxide for MOV disk 20 may be of the same material used for any high energy, high voltage MOV disk, and preferably is made of a formulation of zinc oxide. See, for example, U.S. Pat. No. 3,778,743 of the Matsushita Electric Industrial Co., Ltd., Osaka, Japan, incorporated herein by reference. In the preferred embodiment, MOV disk 20 will have a uniform microstructure throughout the MOV disk. The voltage current relationship for MOV disk 20 is expressed as $I=kE^n$ where I is the arrester current, k is a constant, E is the arrester voltage, and n is the nonlinear exponent or coefficient. In the present invention, the exponent n of MOV disk 20 is not less than 10, and preferably is within the range of approximately 10 to 20. The voltage ratings of the MOV disk 20 range from 120 volts to 650 volts.

Prior art MOV disks for secondary side surge arresters generally have been capable of conducting 10,000 amps of surge current or less. See U.S. Pat. No. 4,809,124 of the General Electric Company for a high-energy, low-voltage surge arrester, incorporated herein by reference. Often, prior art MOV disks are not used as high energy surge arresters on the secondary side, but are only used for relatively low energy surge protection.

By contrast, MOV disk 20 of the preferred embodiment should be capable of discharging the high energy surge currents caused by lightening strikes and then thermally recovering so as to be capable of enduring repetitive high surge currents. It is desirable for MOV disk 20 to be able to thermally recover from a high energy surge current while it is energized at the power system's maximum continuous operating voltage (MCOV). MOV disk 20 of the present invention is capable of conducting lightening surge currents of up to 40,000 amps. MOV disk 20 will recover from a 40,000 amp surge current of a short duration such as a 4/10 wave (4 microseconds to crest and decaying to half crest in 10 microseconds).

The cross-sectional area of MOV disk 20 will partially dictate its durability and recoverability from high magnitude surge currents. It is preferred that the circular cross-section of MOV disk 20 have a diameter of between approximately 1.25 to 1.75 inches to insure that there is sufficient surface area of between about 1.23 to 2.40 square inches to maintain the desired durability and recoverability. At the same time, it is also desirable that MOV disk 20 have as small a cross-sectional area as possible in order to reduce the size, weight and cost of the arrester. As the size is reduced, however, the durability and recoverability of the disk is decreased. Given these considerations, a diameter of approximately 1.5 inches is the most preferred. The thickness of MOV disk 20 as measured between facing surfaces 22 and 24 is within the range of 0.176 to 0.196 inches and preferably is about 0.19 inches. As understood by those skilled in the art, given a particular metal oxide formulation and a uniform or consistent microstructure throughout the MOV disk, the thickness of the MOV disk determines the "turn-on" or operating voltage of MOV disk 20.

The MOV disks that are most preferred for MOV disk 20 are manufactured by Cooper Power Systems, Inc. and are presently identified by catalog numbers AS36X1C and AS36X2C and have the following characteristics:

| Catalog Number | Suggested MCOV | Suggested Rating | Low-Current-Long-Duration | High-Current-Short-Duration |
|---|---|---|---|---|
| AS36X1C | 400 V | 480 V | 75 A 2000 μs | 40 kA 4/10 μs |
| AS36X2C | 540 V | 650 V | 75 A 2000 μs | 40 kA 4/10 μs |

Referring still to FIG. 1, a metalized coating 26 is applied to facing surfaces 22 and 24 of MOV disk 20. Preferably, metalized coating 26 covers substantially the entire area of facing surfaces 22 and 24. At a minimum, metalized coating 26 should cover the entire portions of facing surfaces 22 and 24 which contact electrodes 30 and 32. In the preferred embodiment, coatings 26 are sprayed-on metalized coatings of molten aluminum having a thickness within the range of approximately 0.002 to 0.010 inches.

Figure 12:
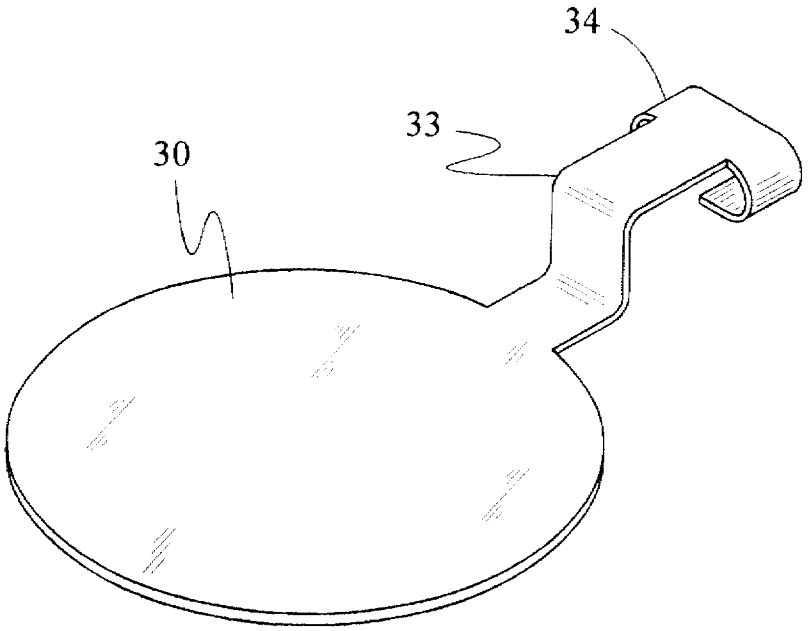
FIG. 12 shows a perspective view of the electrode employed in the surge arrester shown in FIG. 1.

Referring now to FIGS. 1 and 12, electrodes 30 and 32 are disposed about facing surfaces 22 and 24, respectively, of MOV disk 20. Electrodes 30, 32 include a contact surface 31 which is positioned against metalized coating 26 on MOV facing surfaces 22, 24. Electrodes 30, 32 are generally circular in shape and preferably made of brass or copper, although any good conducting material may be employed. Electrodes 30, 32 should have a diameter large enough to insure that substantially the entire MOV disk 20 is employed in conducting the impulse or surge current to ground. Insuring that the surge current is conducted through the entire cross-sectional area of MOV disk 20 is important in providing arrester 10 with its significantly increased High-Current-Short-Duration capability. In the preferred embodiment, electrodes 30, 32 are identical and are approximately 1.0 inches in diameter and have a thickness of approximately 0.032 inches. Electrodes 30, 32 should be relatively thin and flexible so as to conform to facing surfaces 22, 24 when compressed against MOV disk 20 by spring clip 40. Terminals 34 and 36 are identical crimp-type electrical connectors which are attached to and electrically in series with electrodes 30 and 32, respectively. Terminals 34, 36 are attached to electrodes 30, 32 by means of S-shaped extensions 33, best shown in FIG. 12. Preferably, terminals 34, 36 and extensions 33 are formed integrally with electrodes 30, 32 from a single piece of conducting material.

Terminals 34 and 36 are employed to electrically interconnect electrodes 30 and 32 with conductors 50 and 52, respectively. Conductors 50, 52 should be connected to terminals 34, 36 in a manner that will eliminate arcing which might otherwise occur during a high magnitude surge, such as a 40 kA impulse. One such means is to first crimp conductors 50, 52 within terminals 34, 36 and then to solder the crimped connection. Alternatively, conductors 50, 52 may each include a spade connector that is inserted into terminal 34, 36, with the resulting connection then covered with a heat shrink material.

Referring once again to FIG. 1, spring clip 40 generally comprises body portion 46 and a pair of attached spring arms 42 and 44. It is preferred that spring arms 42, 44 and body portion 46 be formed integrally from a single, ribbon-like strip of material. Spring arms 42 and 44 are disposed about electrodes 30, 32 and impart a compressive force against the electrodes to retain electrodes 30, 32 against facing surfaces 22, 24 of MOV disk 20 so as to create a good conductive path through the subassembly comprising MOV disk 20 and electrodes 30, 32. Preferably, spring clip 40 should provide at least approximately two, and preferably five, pounds of force. As shown in FIG. 1, spring clip 40 is made of insulative material. In the preferred embodiment, spring clip 40 is made of a glass filled polyester. Alternatively, spring clip 40 may be made of a conducting material, such as spring steel; however, in that instance, one or both spring arms 42, 44 must be insulated from electrodes 30, 32 to prevent spring clip 40 from providing a short circuit between electrodes 30 and 32. This may be accomplished by disposing an insulative material such as mylar or fish paper between a spring arm 42, 44 and the adjacent electrode, or by coating the innersurfaces 43, 45 of spring arms 42, 44 with an insulative epoxy.

Arrester 10 also includes a dielectric coating 12 which envelopes, insulates and seals MOV disk 20, electrodes 30, 32 and spring clip 40. If desired, coating 12 may be applied so as to also cover and envelope terminals 34, 36 after conductors 50 and 52 have been attached. It is preferred that dielectric coating 12 comprise an epoxy, such as the epoxy having the designation Dk-17 Black as manufactured by the Dexter Electronic Materials Division of the Dexter Corporation. During manufacture, the assembled arrester is dipped or emersed in liquid or powdered epoxy. The assembly is then removed and the coating allowed to cure or harden. In this manner, the void 54 between MOV disk 20 and base portion 46 of spring clip 40 is substantially filled with the dielectric coating 12. Because dielectric coating 12 completely surrounds, seals, and insulates the electrodes and disk, MOV disk 20 may be collarless, and in the preferred embodiment is collarless. The high energy MOV disks of the prior art typically required either ceramic or epoxy collars to act as a dielectric and prevent flashovers. Although MOV disks having such collars may be successfully employed in the invention, the elimination of the collar on the MOV disk 20 provides a substantial manufacturing cost advantage to the surge arrester 10 of the present invention. Additionally, the spring force imparted by spring clip 40 is not dependent upon the existence of a housing. Accordingly, arrester 10 may be manufactured without a conventional housing and with dielectric coating 12 providing the insulation that is desirable to prevent flashover across disk 20 and to prevent arrester 10 from contacting any other conducting materials, such as the transformer enclosure or other internal transformer components.

Conductors 50 and 52 electrically connect electrodes 30 and 32 to the terminals of the transformer secondary, such as the $X_1$ and $X_0$ terminals in the case of a typical single phase distribution transformer. Typically, the voltage between terminals $X_1$ and neutral $X_0$ is nominally 120 volts. So connected, arrester 10 is physically supported within the transformer enclosure by conductors 50, 52 only. Arrester 10 may be positioned either under-oil or above the oil in the transformer enclosure.

In operation, when the primary winding of the transformer being protected by arrester 10 is energized, a designed potential difference is created between secondary neutral terminal $X_0$ and line potential terminal $X_1$. When a surge current occurs on the transformer's low-voltage or secondary windings, as may typically occur due to a lightning strike, for example, a transient over-voltage is induced which will appear between terminals $X_1$ and grounded neutral terminal $X_0$. This will induce an over-voltage condition of proportionately greater magnitude within the primary winding which, if allowed to persist, could damage or destroy the transformer. If the secondary side transient voltage rises to the turn-on voltage of MOV disk 20, the disk becomes highly conductive and serves to conduct the resulting transient current to ground, shunting the potentially damaging current around the secondary winding. As the transient over-voltage and resulting current dissipate, the MOV disk's impedance once again increases, restoring the arrester 10 and the electrical system to the normal, steady state condition.

The arrester 10 and MOV disk 20 have a 5-KA duty cycle rating and a 40-KA High-Current-Short-Duration capability as these ratings are defined in ANSI/IEEE Standard C62.11-1987. The discharge characteristics of arrester 10, also as determined by ANSI/IEEE C62.11-1987, are shown in the table below:

| Catalog | Suggested Rating | Suggested MCOV | Maximum Discharge Voltage (kV) 8/20 μs Current Wave | | | | |
|---|---|---|---|---|---|---|---|
| Number | (V rms) | (V rms) | 1.5 kA | 5 kA | 10 kA | 20 kA | 40 kA |
| AS36X1C | 480 | 400 | 1.7 | 1.9 | 2.1 | 2.4 | 2.9 |
| AS36X2C | 650 | 540 | 2.1 | 2.4 | 2.6 | 3.0 | 3.6 |

In addition to being installed at the secondary of a distribution transformer, arrester 10 may be installed adjacent to other low voltage electrical apparatus, such as motors, pumps, and compressors, or at the service entrance of a residential or commercial building. When arrester 10 is not installed within a transformer enclosure, but is instead installed in an exposed location where the arrester may be subject to impacts, other physical disturbances, and possibly harsh environmental conditions, arrester 10 may be mounted and protected in a housing, such as that described in application Ser. No. 07,598,267, the entire disclosure of which is hereby incorporated by reference. Such a housing is particularly shown in and described with reference to FIGS. 1–3 of that application. The housing chosen should be of a material that is UV resistant, resilient and nonfragmenting. When arrester 10 is enclosed in such a housing, the dielectric coating 12 is not required. When housed, the space between arrester 10 and the internal surfaces of the housing may be potted with a potting compound, such as that described in application Ser. No. 07,598,267. Preferably, the potting compound would be temperature insensitive and remain electrically stable at temperatures up to approximately 120° C. The potting compound should also be able to dissipate large quantities of heat without decay and should be resilient so as to enable the arrester to safely vent the gases that are formed within the arrester housing upon an arrester failure. One such potting compound found to be particularly desirable is product No. SX-7611 manufactured by Castall, Inc.

Figure 13:
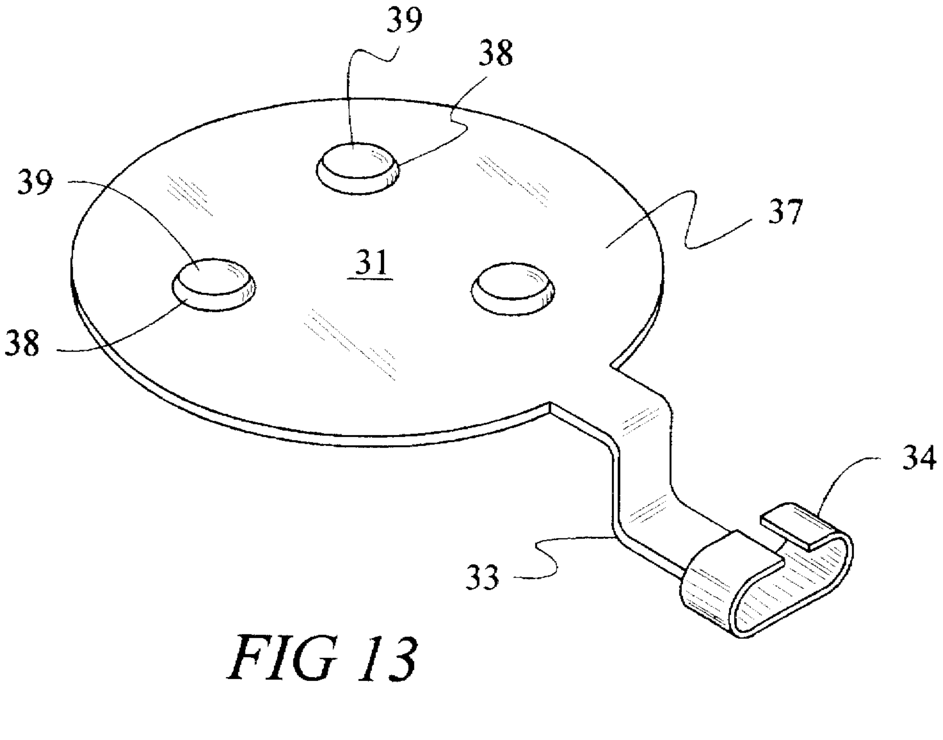
FIG. 13 shows a perspective view of an alternative embodiment of the electrode employed in the surge arrester shown in FIG. 1.

Referring briefly to FIG. 13, there is shown an electrode 37 which may be employed in the present invention as an alternative to electrodes 30, 32 shown and described with reference to FIG. 1. As shown in FIG. 13, electrode 37 includes preferably three dimples or raised portions 38. Each raised portion 38 forms a contact surface 39 having a circular contact area with a preferred diameter of approximately 0.2 inches. Raised portions 38 have a height within the range of approximately 0.006 to 0.015 inches and preferably are approximately 0.008 inches high. The center of each raised portion 38 is located approximately 0.66 inches from the center of the other two raised portions 38, and approximately 0.38 inches from the center of electrode 37. So positioned, raised portions 38 are formed in the pattern of an equilateral triangle and provide a three-point electrical contact with the facing surfaces 22, 24 of MOV disk 20.

The dimple arrangement for electrode 37 assists in insuring that surge current is spread out across the entire cross-sectional area of MOV 20 when arrester 10 is caused to operate. The dimpled arrangement on electrode 37 insures good electrical contact between the electrode and MOV disk 20. MOV disks having a thickness of 0.05 to 0.25 inches are delicate and difficult and costly to manufacture. In manufacturing such MOV disks, it is sometimes difficult to achieve a high surface finish so as to achieve a flat planar surface-to-surface contact with a flat, undimpled electrode. The three-point dimpled contact provided by raised portions 38 with the metalized coating 26 on MOV facing surfaces 22, 24 insures that good electrical contact will be achieved without regard to surface finish. Furthermore, disk warpage and disk distortion are possible during the sintering of MOV disk 20. The three-dimpled arrangement shown in FIG. 13 for electrode 37 may provide significant cost savings by eliminating the grinding or surface processing of MOV disk 20 which would otherwise be necessary to achieve the required surface finish for proper electrical contact.

Figure 2:
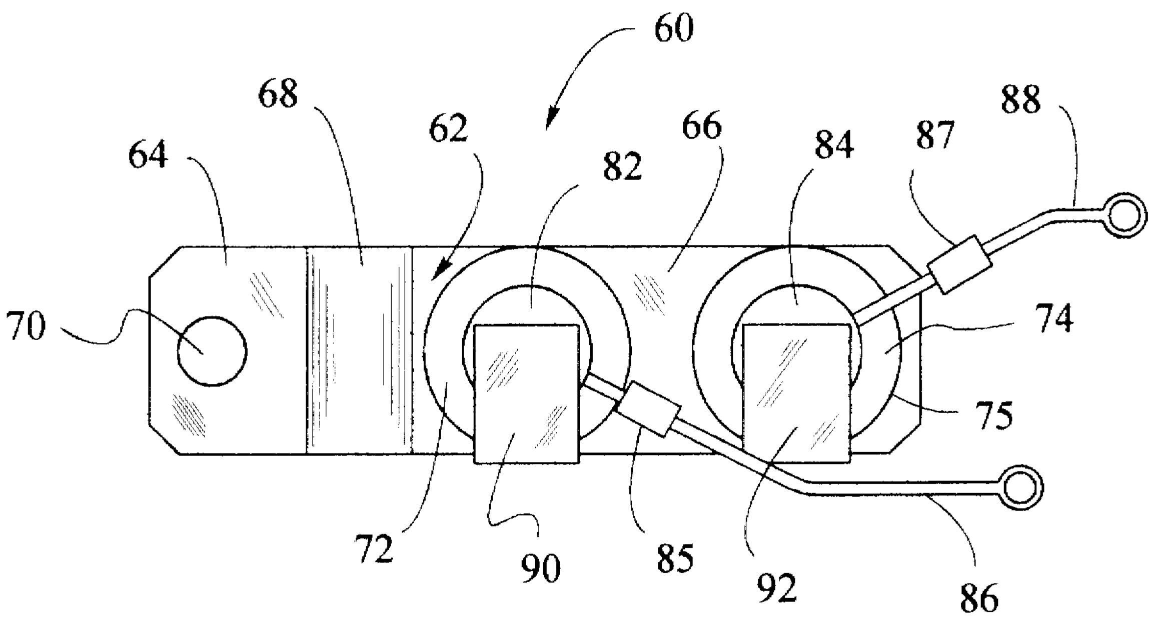
FIG. 2 shows a plan view of an alternative embodiment of the present invention, particularly adapted for use with transformers having dual secondary voltages.
Figure 3:
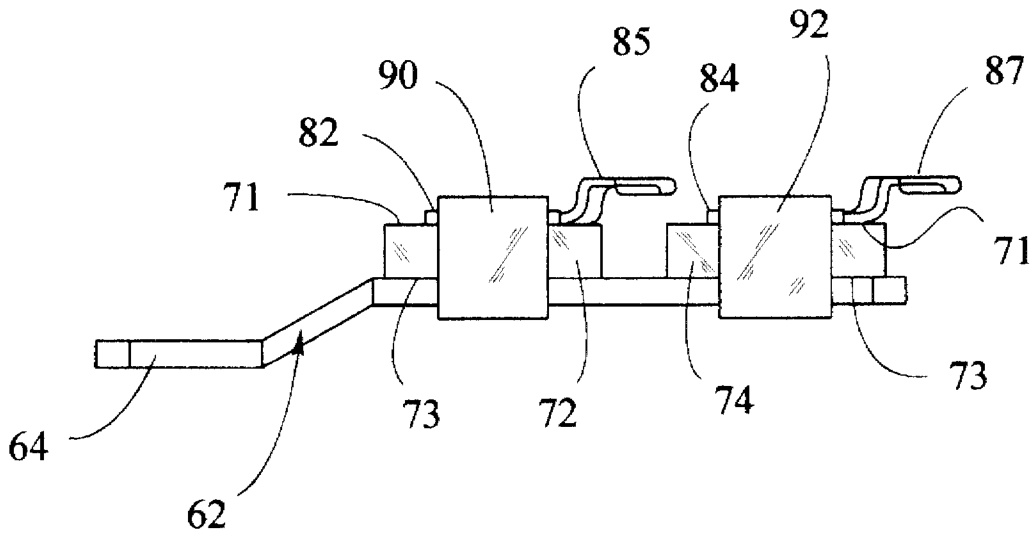
FIG. 3 shows a side elevation view of the surge arrester shown in FIG. 2.

FIGS. 2 and 3 show an alternative embodiment of the present invention that is especially adapted for installation within transformers having dual secondary windings, such as transformers having secondary side voltage levels of 120/240 volts. As shown in FIGS. 2 and 3, surge arrester 60 includes a conducting plate 62, MOV disks 72 and 74, electrodes 82 and 84 and spring clips 90, 92. The MOV disks 72, 74 of the arrester 60 are the same as MOV disk 20 described above with reference to FIG. 1. Electrodes 82 and 84 are identical to electrodes 30 and 32 previously described with reference to FIG. 1. Likewise, spring clips 90 and 92 are identical to spring clip 40 described above.

Conducting plate 62, which is preferably made of aluminum or other conducting material, includes two generally parallel portions 64 and 66, connected by an offset intermediate segment 68. Formed through portion 64 is a mounting aperture 70 for mounting arrester 60 under-oil on the neutral bushing stud $X_0$ within the transformer enclosure.

Figure 4:
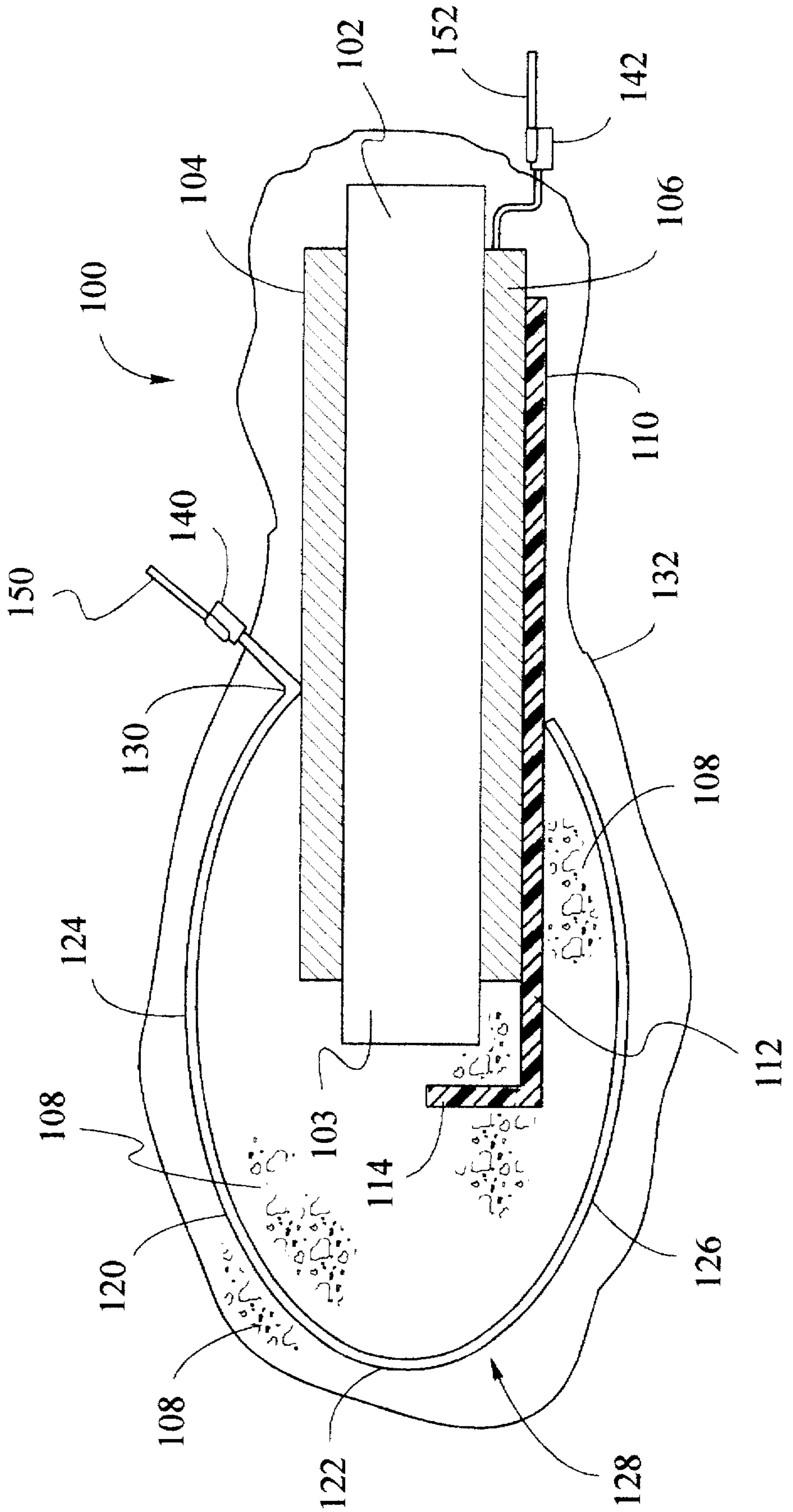
FIG. 4 shows a cross-sectional view of an alternative embodiment of the surge arrester and spring clip assembly shown in FIG. 1.

Each MOV disk 72, 74 includes an upper facing surface 71 and a lower facing surface 73. Facing surfaces 71, 73 of MOV disks 72, 74 are metalized as described previously with respect to FIG. 1. As shown in FIGS. 3 and 4, MOV disks 72, 74 are positioned on plate 62 with their lower facing surface 73 in electrical and physical engagement with portion 66 of plate 62. Electrodes 82, 84 are disposed about upper facing surface 71 of disks 72, 74 respectively. Electrodes 82, 84 and MOV disks 72, 74 are retained on plate 62 in the stacked position shown by spring clips 90, 92 which provide a spring force of at least approximately two and preferably five pounds. A dielectric coating (not shown), which may be identical to coating 12 described above, is applied about MOV disks 72, 74, electrodes 82, 84, spring clips 90, 92 and portion 66 of conducting plate 62. Preferably, terminals 85, 87 and portion 64 of conducting plate 62 are not coated. Thus constructed, arrester 60 has the same duty rating, energy handling capability and discharge voltage characteristics as described above with respect to arrester 10 of FIG. 1.

The surge arrester 60 is preferably mounted on the interior of the transformer. When installed, plate 62 forms a common electrode for MOV disks 72 and 74 which is electrically connected to the secondary neutral terminal $X_0$ of a dual voltage transformer. The bushing stud of terminal $X_0$ is disposed through aperture 70 in plate 62. Conductor 86 is electrically connected to electrode 82 by crimp type terminal 85 while conductor 88 is similarly connected to electrode 84 by crimp-type terminal 87. Terminals 85, 87 are identical to terminals 34 and 36 previously described. Conductors 86 and 88 are employed to electrically interconnect arrester 60 to the secondary line-potential bushings $X_1$ and $X_2$. Although it is recommended that the surge arrester be submerged in the oil contained in the transformer, such submerging is not required. The surge arrester 60 may be mounted within the air environment above the oil in the transformer so long as the transformer enclosure is sealed to prevent moisture and pollutant contamination from entering the enclosure.

Figure 5:
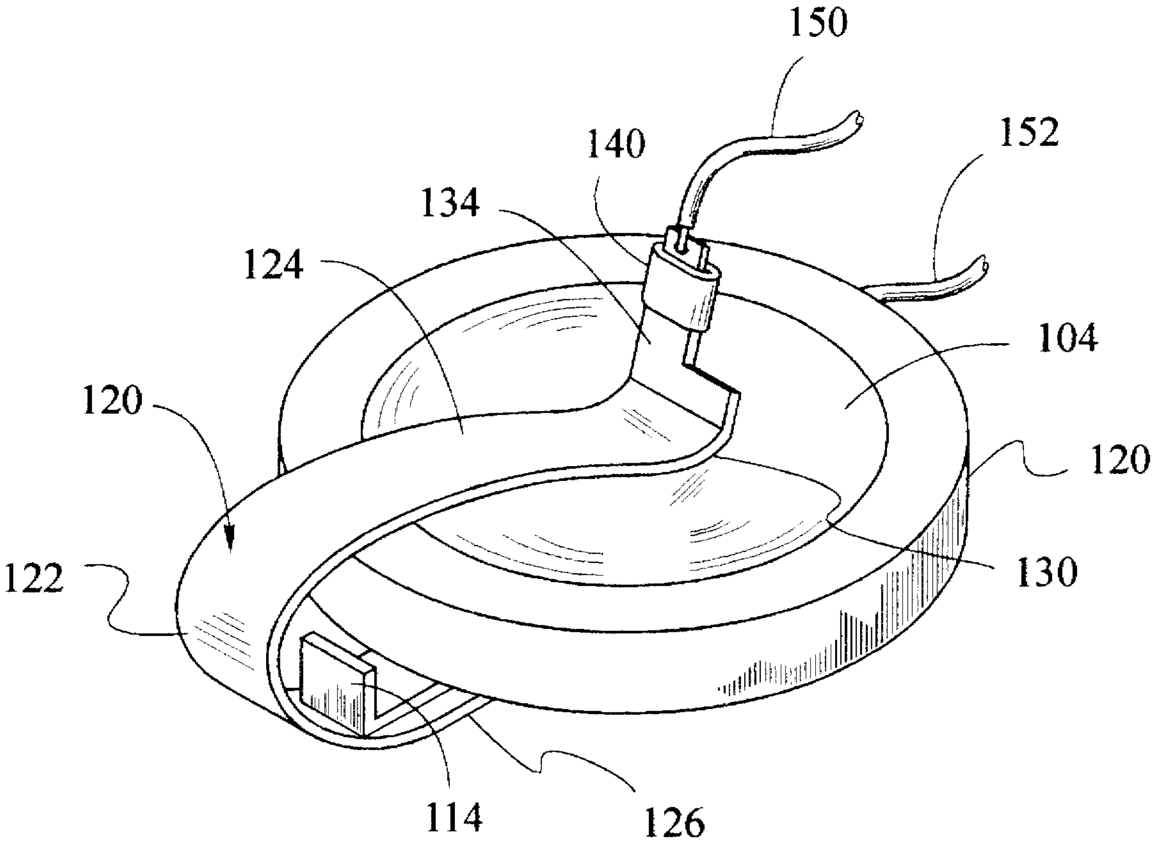
FIG. 5 shows a perspective view of the spring clip assembly and surge arrester shown in FIG. 4 before the dielectric coating is applied to the assembly.

Referring now to FIGS. 4 and 5, there is shown another alternative embodiment of the present invention. As best shown in FIG. 4, arrester 100 generally comprises MOV disk 102, electrodes 104, 106, insulator 110 and spring clip 120. MOV disk 102 is identical to MOV disk 20 previously described and includes a metalized coating (not shown) on each facing surface. Likewise, electrodes 104, 106 are identical in structure and function to electrodes 30, 32 previously described, except that electrode 104 does not necessarily include (but may include) a terminal formed thereon such as terminal 34 shown in FIG. 1.

Spring clip 120 generally comprises body portion 122 and attached spring arms 124, 126. Spring arms 124, 126 and body portion 122 are preferably formed from a ribbon-like metallic strip bent to form a lobe 128, spring arms 124, 126 comprising arcuate segments of lobe 128. Spring clip 120 is preferably made of phosphorus bronze from a strip approximately 2.9 inches long, 0.75 inches wide and 0.032 inches thick, although other materials and dimensions may be employed in the invention. Preferably, spring clip 120 should provide a spring force of at least approximately two pounds and preferably five pounds which has been determined to be satisfactory to maintain good electrical contact between MOV disk 102 and electrodes 104,106. The ends of spring arms 124, 126 include contact portions 130, 132 respectively. Integrally formed on contact portion 130 is spade connector 134, best shown in FIG. 5. Terminal 140 is crimped to spade connector 134 and provides a means for landing and connecting lead 150. Electrode 106 includes a terminal 142 for landing and securing lead 152.

Because spring clip 120 in this alternative embodiment is made of a conducting material, insulator 110 is interposed between electrode 106 and spring arm 126 to prevent electrodes 104 and 106 from being shorted by spring clip 120. Insulator 110 includes base portion 112 and end portion 114. As shown, end portion 114 is disposed substantially at right angles to base portion 112 and provides a dielectric barrier between the edge 103 of MOV disk 102 and base portion 122 of spring clip 120. It is preferred that insulator 110 comprise a mylar material having thickness of approximately 0.04 inches, although any high dielectric strength insulating material, such as fish paper, may be employed.

As shown in FIG. 4, arrester 100 also includes a dielectric coating 108 which is identical to dielectric coating 12 previously described with reference to FIG. 1. For purposes of better illustrating spring clip 120, arrester 100 is shown in FIG. 5 without coating 108. Thus, FIG. 5 illustrates arrester 100 as it would appear before being emersed in the dielectric. Coating 108 alone provides the dielectric barrier necessary between MOV disk 102 and spring arm 126 once arrester 100 is properly assembled. Nevertheless, to prevent spring clip 120 from being unintentionally placed in contact with disk edge 103 or electrode 106 during assembly of arrester 100, insulator 110 is provided with end portion 114.

Figure 6:
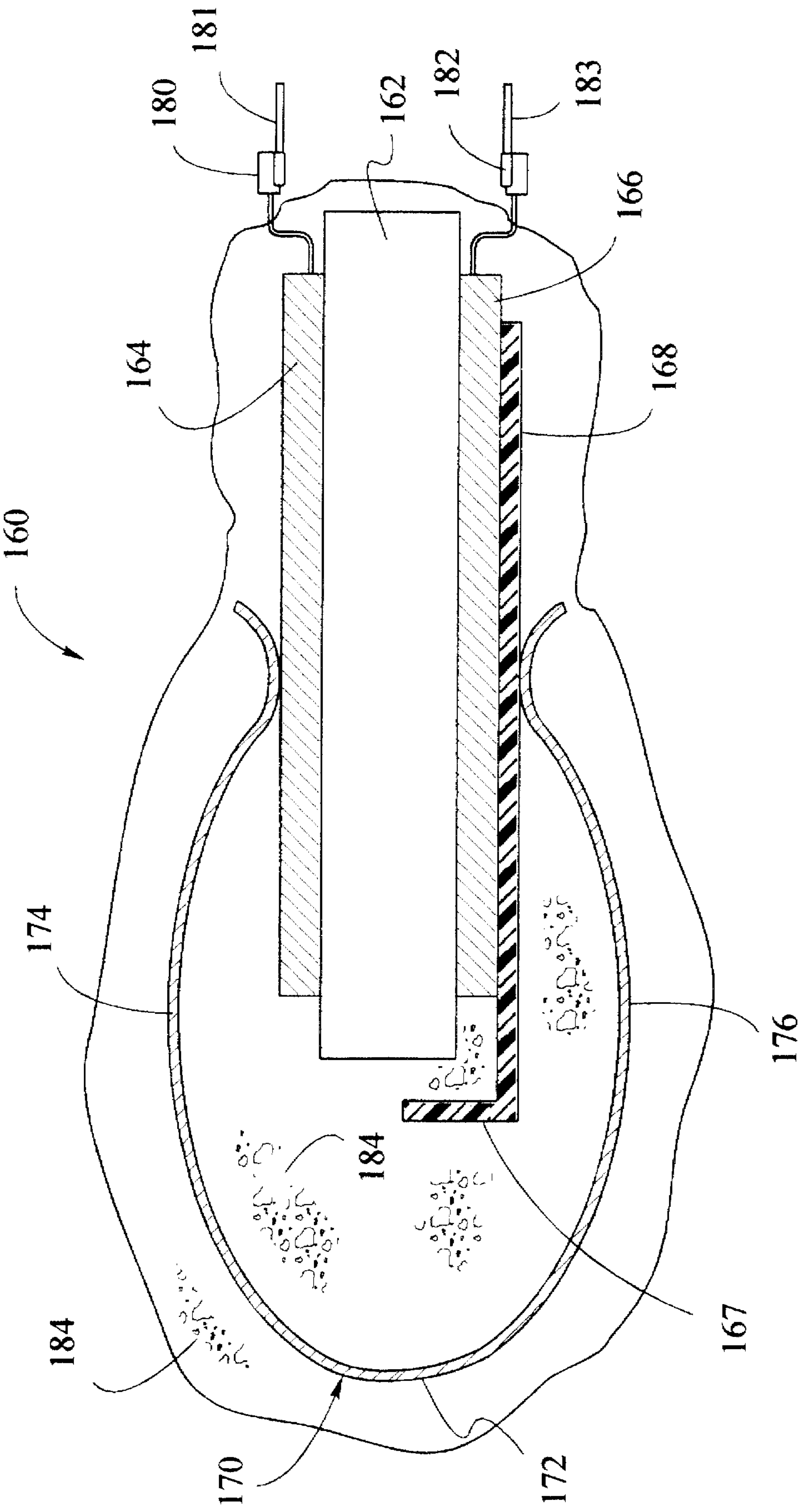
FIG. 6 shows a cross-sectional view of another alternative embodiment of the surge arrester and spring clip of the present invention.

Another alternative embodiment of the present invention is shown in FIG. 6. As shown, arrester 160 generally comprises MOV disk 162, electrodes 164, 166, insulator 168 and spring clip 170.

MOV disk 162 includes metalized coatings on each facing surface and is identical to MOV 20 previously described with reference to FIG. 1. Likewise, electrodes 164,166 are identical to electrodes 30, 32 previously described. Insulator 168 is identical in structure and function to insulator 110 described above with reference to FIG. 4.

In this embodiment, spring clip 170 comprises body portion 172 and a pair of S-shaped spring arms 174, 176 integrally formed with body portion 172. Spring clip 170 again supplies the compressive force required to maintain good electrical connections between MOV 162 and electrodes 164, 166. Terminals 180 and 182 are electrically connected to electrodes 164, 166 respectively.

Spring clip 170 may be formed from a relatively thin, ribbon-like metallic strip approximately 2.6 inches long, 0.75 inches wide, and 0.032 inches thick. Phosphorous bronze or spring steel is the preferred material for use in manufacturing spring clip 170, although other materials may be employed. If spring clip 170 is made from an insulative material, those skilled in the art will understand that it is not necessary to impose insulator 168 between spring arm 176 and electrode 166. Because the preferred material for spring clip 170 will conduct current, insulator 168 is disposed between spring arm 176 and electrode 166. Insulator 168 also includes end portion 167 to provide a dielectric barrier between MOV disk 162 and spring clip 172 during assembly. A dielectric coating 184 identical to coating 12, previously described, is disposed about spring clip 170, MOV 162, electrodes 164, 166 and insulator 168 after assembly. Conductors 181 and 183 interconnect terminals 180 and 182 with the desired transformer terminals, such as terminals $X_1$ and $X_0$.

Figure 7:
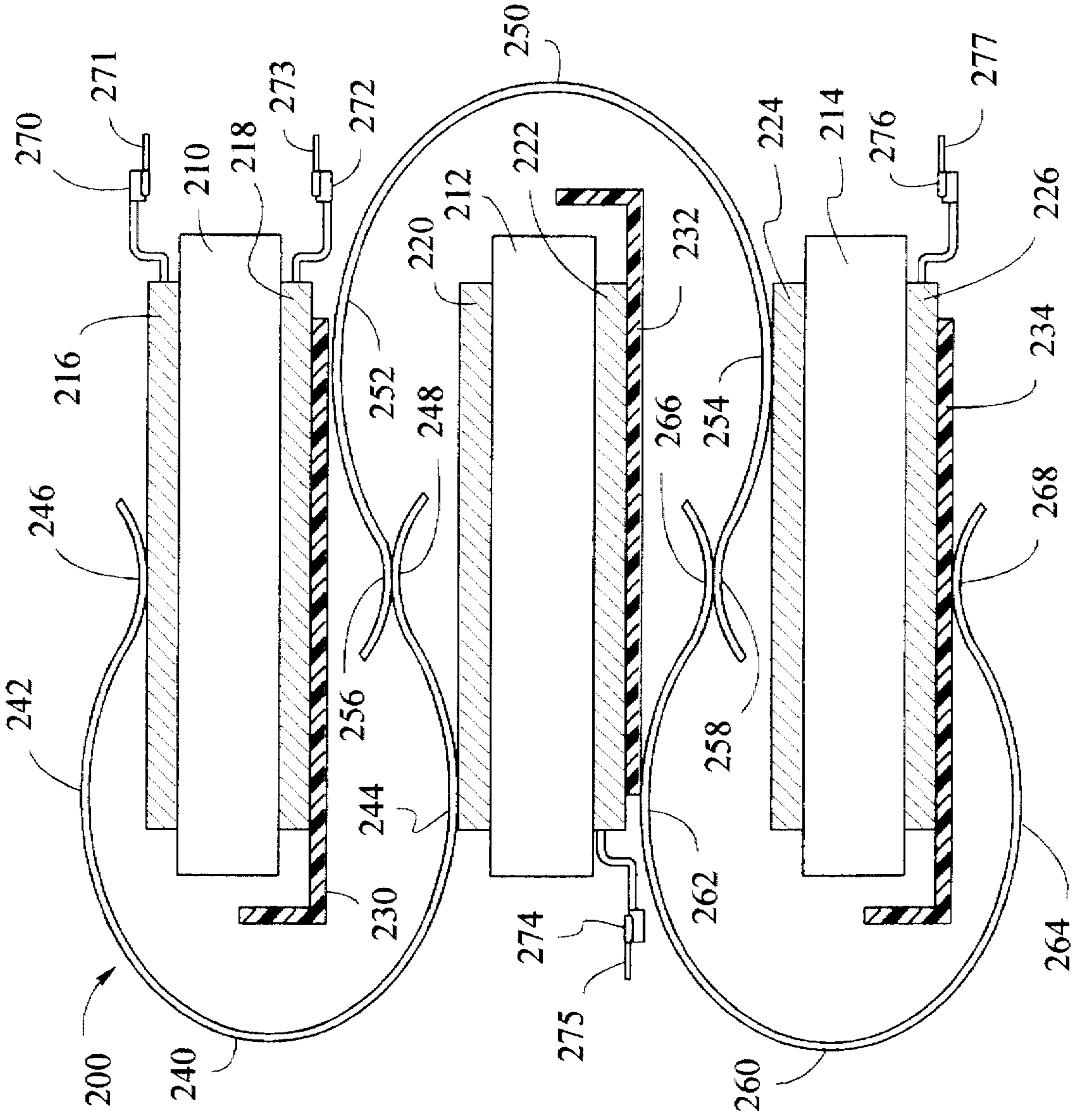
FIG. 7 shows another alternative embodiment of the present invention in which the spring clip assembly of FIG. 6 is employed in a multi-pole surge arrester for use in a three-phase distribution transformer.

The S-shaped spring arms 174, 176 as shown in FIG. 6 are preferably made of a conductive material so as to be interlaced and to facilitate electrical interconnection with similarly shaped spring arms of adjacent MOV subassemblies, as shown more clearly in FIG. 7.

Referring now to FIG. 7, there is shown a series of MOV sub-assemblies connected to form a three-pole surge arrester 200 which comprises another alterative embodiment of the present invention that is particularly suited for use with three-phase transformers. As shown, arrester 200 includes MOV disks 210, 212, 214 spaced apart from one another and retained in columnar fashion. MOV disk 210, 212, 214 include metalized layers applied to each facing surface and are identical to MOV 20 previously described with reference to FIG. 1.

Electrodes 216, 218 are disposed about the facing surfaces of MOV disk 210. Likewise, electrodes 220, 222 are positioned about MOV disk 212 and electrodes 224, 226 are disposed about MOV disk 214. Electrodes 216, 218, 220, 222, 224, 226 are all identical to electrodes 30, 32 previously described.

Spring clips 240, 250, 260 have their spring arms interlaced and together cooperate to apply the compressive force necessary to maintain contact between the MOV disks 210, 212, 214 and their respective electrodes. Additionally, spring clips 240, 250, 260 electrically interconnect electrodes 216, 220 and 224 into a common electrode as described more fully below. Spring clips 240, 250, 260 are all identical to spring clip 170 previously described with reference to FIG. 6.

Spring clip 240 includes spring arm 242 and 244 which, in turn, include contact portions 246, 248 respectively. Spring clip 250 includes springs arm 252, 254 which have contact portions 256 and 258 respectively. Likewise, spring clip 260 includes spring arms 262, 264 which have contact portions 266 and 268. As shown, contact 246 of spring clip 240 provides a compressive force against, and electrically engages, electrode 216. Contact 248 of spring clip 240 electrically engages contact surface 256 of spring clip 250. Contact 258 of spring clip 250 similarly contacts and electrically engages contact surface 266 of spring clip 260. Contact surface 268 of spring clip 260 contacts and provides a compressive force against insulator 234 which is interposed between electrode 226 and spring arm 264 of spring clip 260. Similar insulators 230, 232 are disposed between spring arm 252 and electrode 218 and between spring arm 262 and electrode 222, respectively. Insulators 230, 232, 234 are identical to insulator 110 previously described with reference to FIG. 4. As shown in FIG. 7, spring arm 244 of spring clip 240 is in electrical contact with electrode 220. Similarly, spring arm 254 of spring clip 250 is in electrical contact with electrode 224. In this manner, electrodes 216, 220 and 224 are all electrically tied together by means of spring clips 240, 250, 260.

Terminals 270, 272, 274 and 276 are provided in order to connect arrester 200 to the secondary terminals of a distribution transformer. More specifically, terminal 270 is electrically connected to electrode 216. Terminal 270 is the common terminal and is interconnected by a lead 271 to the neutral busing $X_0$ of the distribution transformer. Because electrodes 216, 220 and 224 are electrically tied together, common terminal 270 may alternatively be connected to electrodes 220 or 224. Terminals 272, 274 and 276 are electrically connected to electrodes 218, 222, and 226, respectively, and are used to land and terminate leads 273, 275, 277 which interconnect terminals 272, 274 and 276 to the transformer secondary line-potential terminals, $X_1$, $X_2$ and $X_3$. A dielectric coating (not shown), which is identical to coating 12 previously described, surrounds and envelopes arrester 200.

Figure 8:
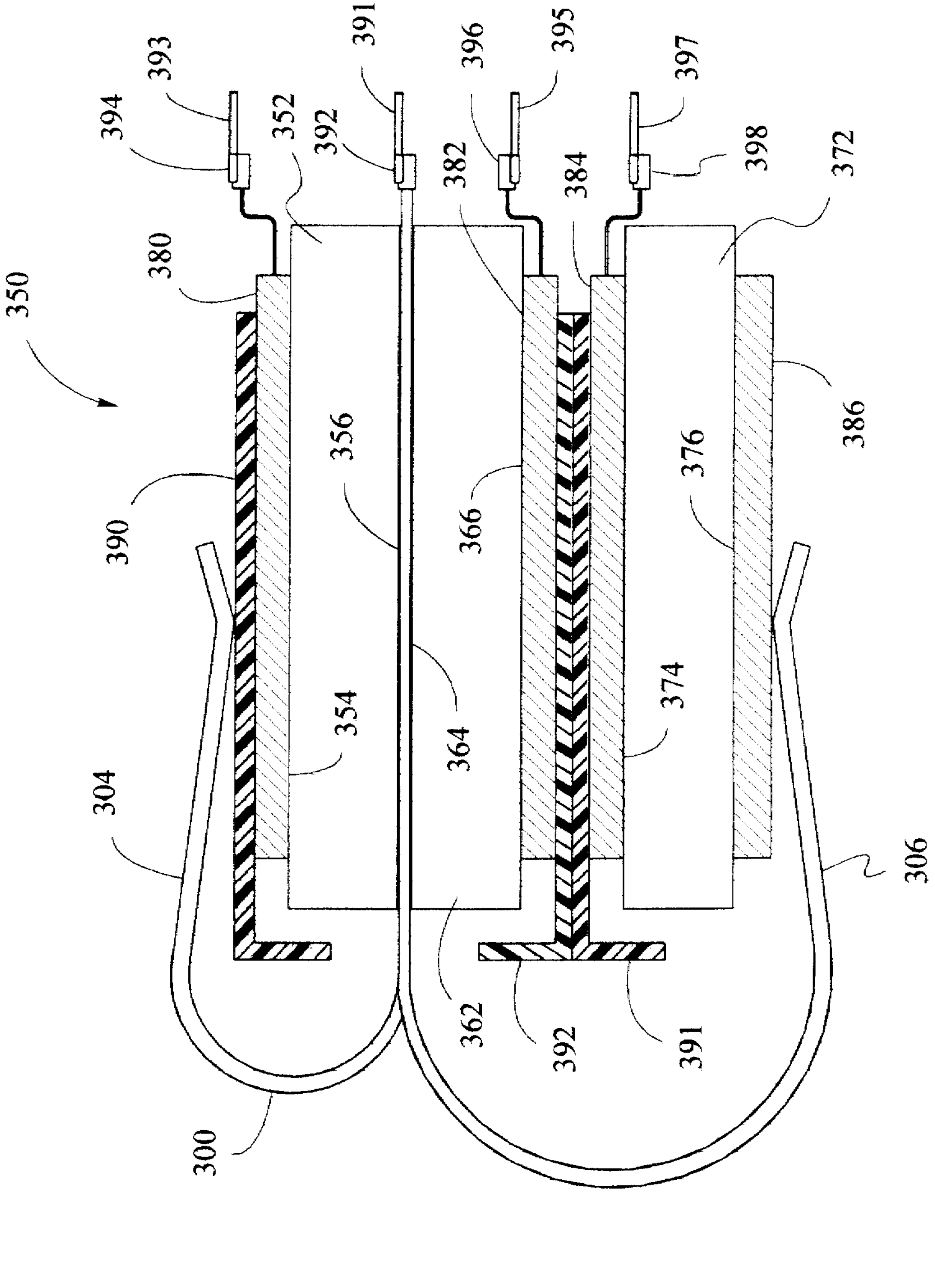
FIG. 8 shows another alternative embodiment of the spring clip assembly and surge arrester of the present invention particularly suited for use in a three-phase distribution transformer.
Figure 9:
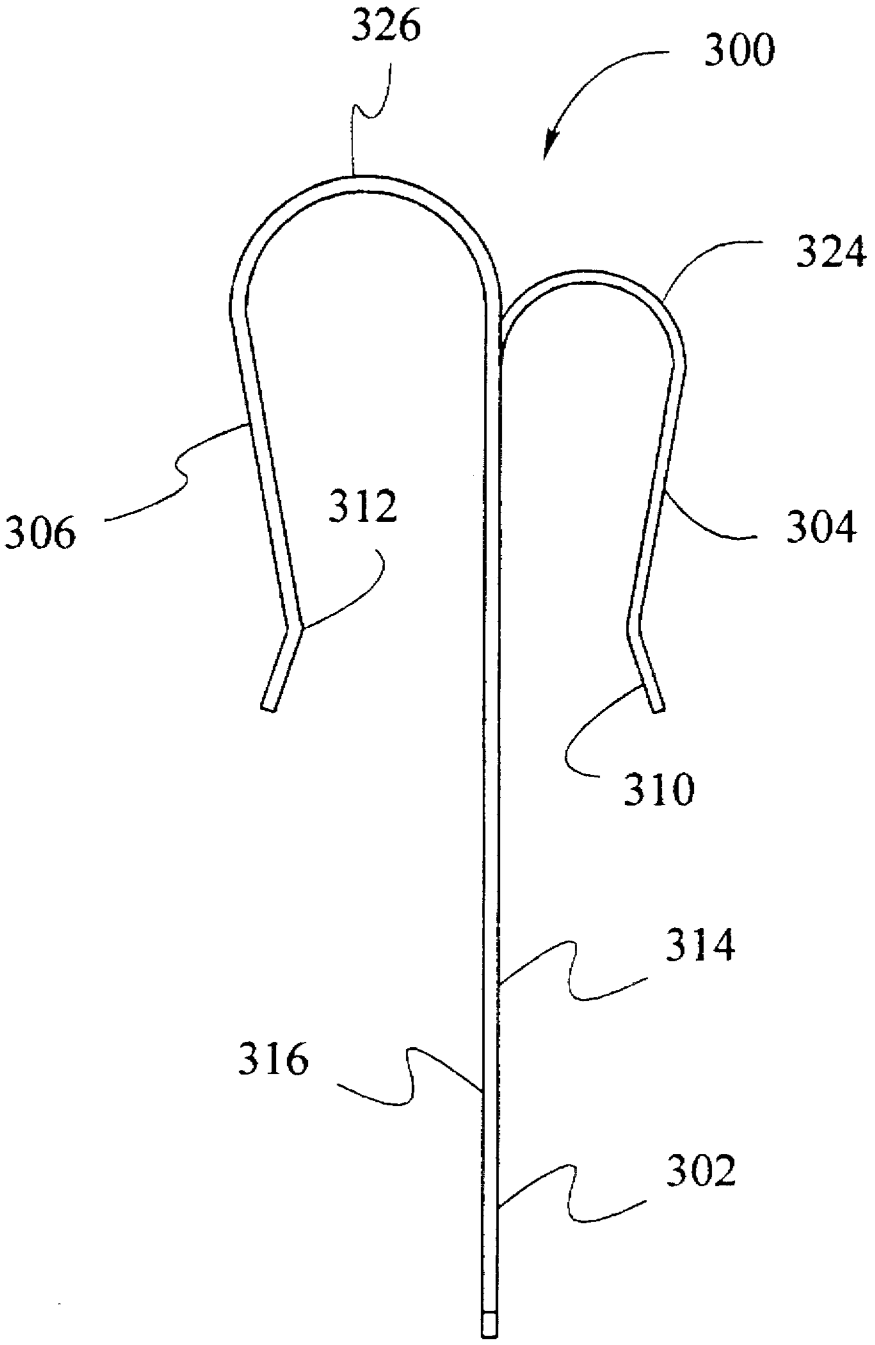
FIG. 9 shows a side elevation view of the spring clip shown in FIG. 8.
Figure 10:
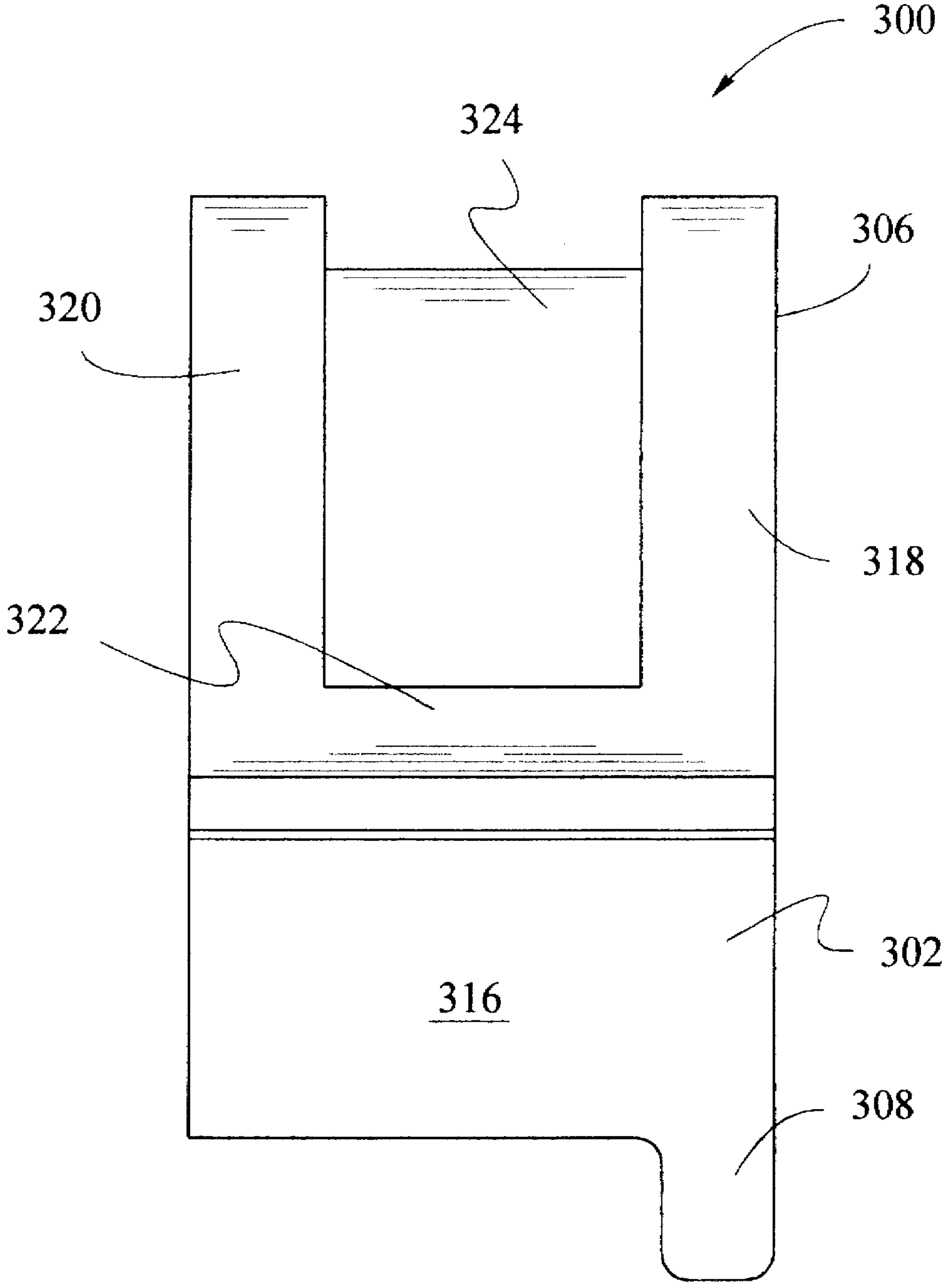
FIG. 10 shows a plan view of the spring clip shown in FIG. 9.

Another alternative embodiment of the present invention is shown in FIGS. 8 through 10. Referring first to FIG. 8, there is shown a multi-pole surge arrester 350 which is particularly suited for protecting a three phase distribution transformer having a grounded neutral connection. As shown, surge arrester 350 generally comprises multi-pole spring clip 300, coaxially aligned MOV disks 352, 362, 372, electrodes 380, 382, 384, 386 and insulators 390, 391, 392. MOV disks 352, 362, and 372 include metalized facing surfaces and are identical to MOV disk 20 previously described with reference to FIG. 1. Electrodes 380, 382 and 384 are identical to electrodes 30, 32 also previously described when discussing FIG. 1. Likewise, insulators 390, 391 and 392 are identical to insulator 110 previously described with reference to FIG. 4.

Spring clip 300 is best shown in FIGS. 9 and 10. Referring now to FIGS. 9 and 10, spring clip 300 is a multi-pole spring clip and generally comprises a base portion 302 and a pair of spring arms 304, 306. Spring arms 304, 306 are each integrally joined to base portion 302. Base portion 302 generally comprises a flat conducting plate having facing surfaces 314, 316 and a tab or extension 308. Spring arm 304 includes a contact surface 310 spaced apart from facing surface 314. Likewise, spring arm 306 includes a contact surface 312 which is spaced apart from facing surface 316 of base 302. As described in more detail below, spring clip 300 provides the compressive force necessary to maintain good electrical contact between a plurality of MOV disks and electrodes. Further, base portion 302 serves as an electrode between MOV disks 352 and 362. Accordingly, in the preferred embodiment, spring clip 300 is made of phosphorous bronze which is both a good conductor and a material suitable for use in leaf-type springs. Alternatively, any good conducting spring steel may be used. It is preferred that the spring force between base portion 302 and each spring arm 304, 306 be at least approximately two pounds and preferably five pounds.

For ease of manufacture and associated cost advantages, it is preferred that base 302 and springs arms 304, 306 be integrally formed from a single, metallic member with spring arm 304 being formed from within spring arm 306. As shown in FIG. 10, spring arm 306 generally comprises side members 318, 320 and a connecting member 322. During manufacture, spring arm 304 is stamped or cut from spring arm 306. Spring arms 304 and 306 are then bent away from base 302 in opposite directions to form lobes 324, 326, lobe 326 having a larger bending radius than lobe 324. In this manner, an aperture 330 is formed in spring arm 306 between edge members 318, 320. As viewed in FIG. 9, before assembly into surge arrester 350, contact surface 310 of spring arm 304 is spaced apart approximately 0.15 inches from base portion 302. Similarly, contact surface 312 of spring arm 306 is spaced apart approximately 0.29 inches from base portion 302 prior to assembly.

Referring again to FIG. 8, MOV 352 is disposed between base portion 302 and spring arm 304 of spring clip 300. Likewise, MOV disks 362 and 372 are disposed between base 302 and opposite spring arm 306. Electrode 380 is disposed on upper facing surface 354 of MOV 352. Insulator 390 is disposed between electrode 380 and spring arm 304. Lower facing surface 356 of MOV 352 is in electrical contact with facing surface 314 of base 302. Likewise, upper facing surface 364 of MOV 362 is electrically engaging facing surface 316 of base 302. Electrode 382 is disposed about lower facing surface 366 of MOV 362. Beneath electrode 382 are insulators 391, 392 to insulate electrode 382 from electrode 384 which is disposed about upper facing surface 374 of MOV 372. Another electrode 386 is disposed between spring arm 306 and lower facing surface 376 of MOV disk 372. Thus as shown in FIG. 8, facing surface 356 and 364 of MOV disks 352 and 362, respectively, are electrically tied together with facing surface 376 of MOV 372 by means of conductive spring clip 300.

Terminal 392 is connected to tab 308 on base portion 302 and comprises the connector for the common lead 391 which is connected internally within the transformer to the neutral bushing $X_0$. Similarly, terminals 394, 396 and 398 are connected to electrodes 380, 382, and 384, respectively, and serve as connections for leads 393, 395 and 397 which are connected to the transformer secondary line-potential bushings $X_1$, $X_2$ and $X_3$. Arrester 350 is enveloped in a dielectric coating (not shown) identical to coating 12 previously described with reference to FIG. 1.

Figure 11:
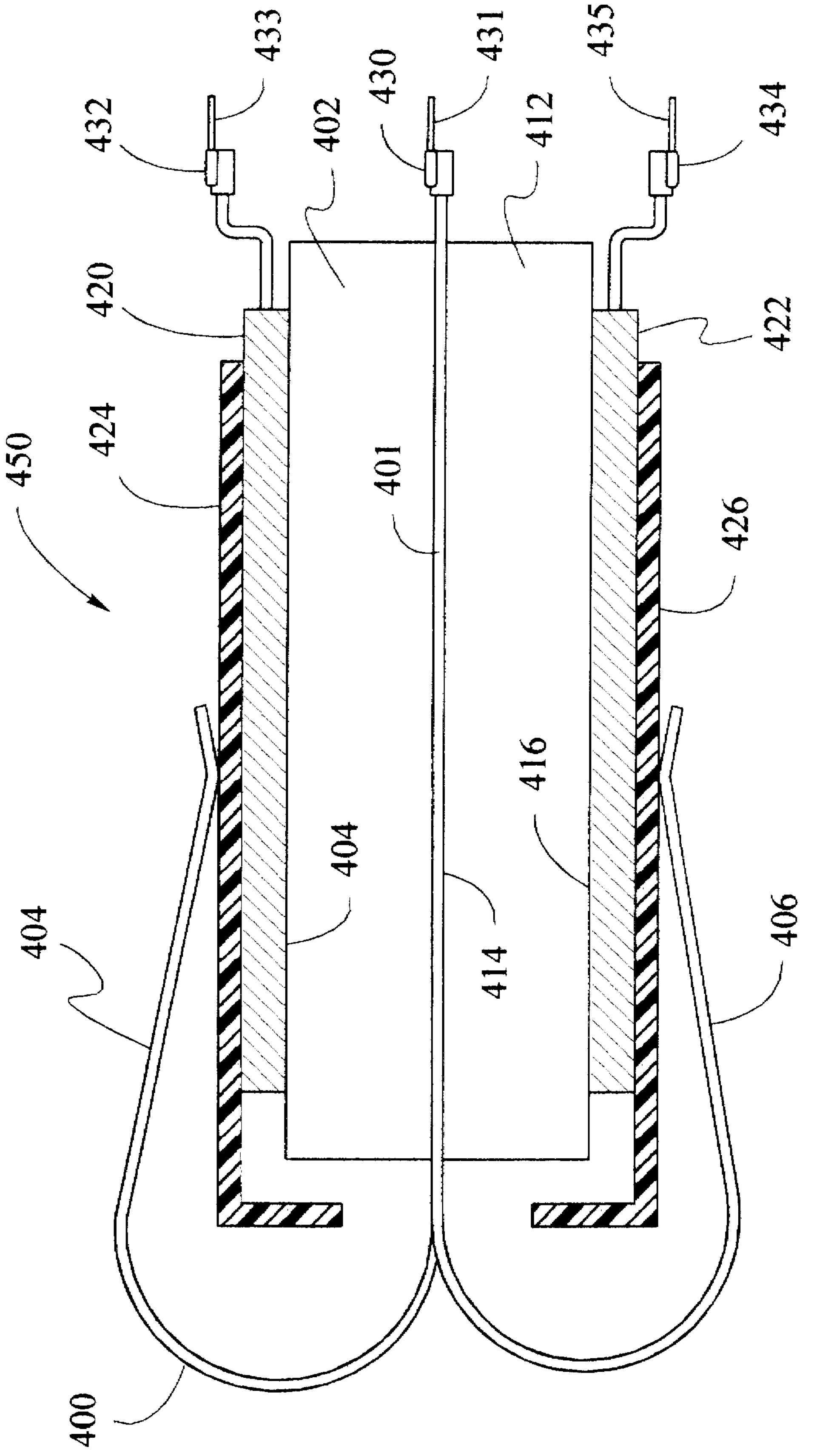
FIG. 11 shows a two-pole version of the surge arrester and spring clip shown in FIG. 8 that is particularly suited for use in a distribution transformer having a dual secondary voltage.

Referring now to FIG. 11, there is shown a two-pole version of the surge arrester shown in FIG. 8. As shown in FIG. 11, surge arrester 450 includes a spring clip 400 and MOV disks 402, 412. Spring clip 400 includes base portion 401 and spring arms 404, 406. Spring clip 400 is identical to spring clip 300 previously described with reference to FIGS. 8–10 except that spring arms 404, 406 of spring clip 400 are set apart substantially the same distance from base portion 401. As shown in FIG. 11, MOV disk 402 is disposed between spring arm 404 and base 401. Similarly, MOV disk 412 is disposed between spring arm 406 and base 401. Electrode 420 is disposed about upper facing surface 404 of MOV disk 402 and electrode 422 is disposed about lower facing surface 416 of MOV disk 412. Insulator 424 is interposed between electrode 420 and spring arm 404. Likewise, insulator 426 is placed between electrode 422 and spring arm 406. Common terminal 430 is electrically connected to base portion 401. Terminals 432 and 434 are electrically connected to electrodes 420, 422, respectively. As will be readily apparent to those skilled in the art, arrester 450 is particularly suited for use with distribution transformers which have dual secondary side voltages. In such an application, common terminal 430 will be electrically connected to transformer secondary bushing $X_0$ via connecting lead 431. In a similar manner, terminals 432 and 434 will be electrically connected to the line potential bushings $X_1$ and $X_2$ via leads 433, 435. In this embodiment, spring arms 404 and 406 will each impart a spring force of at least two pounds and preferably approximately five pounds. Arrester 450 is sealed and enveloped in a dielectric coating (not shown) such as an epoxy coating previously described with reference to FIG. 1.

As understood by those skilled in the art, the surge arresters shown in FIGS. 4, 6, 7, 8 and 11 are preferably mounted within a transformer tank or other equipment enclosure; however, such arresters may instead be housed in either a potted or unpotted housing and then mounted outside the transformer or other equipment enclosure. In such cases, the housing and potting compound employed would be identical to those optional features described above as being suitable for use with arrester 10 of FIG. 1.

While preferred embodiments of the invention have been shown and described, modifications thereof can be made by one skilled in the art without departing from the spirit of the invention. The embodiments described herein are exemplary only and are not limiting. Many variations and modifications of the apparatus described herein are possible and are within the scope of the invention. Accordingly, the scope of this invention is not limited by the description presented above, but is only limited by the claims which follow, that scope including all equivalents of the subject matter of the claims.

What is claimed is:

1. A surge arrester, comprising:

an arrester subassembly including a voltage dependent, nonlinear resistor and an electrode contacting said resistor; and a spring clip having a pair of spring arms disposed about said subassembly and providing a force to retain said electrode and said resistor in contact with one another, wherein said spring clip is made of an insulative material.

2. A surge arrester, comprising:

an arrester subassembly including a voltage dependent, nonlinear resistor and an electrode disposed against said resistor;

a self compressing spring clip having a pair of spring arms disposed about said subassembly and providing a force to retain said electrode and said resistor in contact with one another;

an insulative enclosure housing said resistor and said electrode; and a potting material disposed within said housing.

3. A self-compressing spring clip for a surge arrester comprising:

a pair of opposing spring arms connected by an intermediate body segment integrally formed with said spring arms, said spring arms having proximal ends connected to said intermediate body segment and distal ends that are spaced apart a distance from said body segment;

wherein at least one of said distal ends of said spring arms includes a means for connecting an electrical conductor to said spring arm.

4. The spring clip of claim 3 wherein said connecting means comprises a spade connector integrally formed on said spring arm.

5. A surge arrester comprising:

a first; electrode;

a second electrode;

a voltage dependent, nonlinear resistor having first and second facing surfaces and a current path therebetween, wherein said first facing surface is in contact with said first electrode and said second facing surface is in contact with said second electrode, said electrodes and said resistor comprising an arrester subassembly;

a self-compressing clip member retaining said electrodes in contact with said facing surfaces of said resistor;

means for connecting conducting leads to said electrodes; and wherein said spring arms and said body portion are formed from an insulative material.

6. A surge arrester comprising:

a first electrode;

a second electrode;

a voltage dependent, nonlinear resistor having first and second facing surfaces and a current path therebetween, wherein said first facing surface is in contact with said first electrode and said second facing surface is in contact with said second electrode, said electrodes and said resistor comprising an arrester subassembly;

a self-compressing clip member retaining said electrodes in contact with said facing surfaces of said resistor;

means for connecting conducting leads to said electrodes;

an insulative enclosure housing said electrodes and said resistor; and a potting material disposed within said housing.

7. A surge arrester for mounting on a transformer bushing stud, the arrester comprising:

a plurality of voltage dependent, non-linear resistors, each of said resistors having a first facing surface and a second facing surface and a current path therebetween;

an elongate common electrode having a base portion for mounting said electrode on the transformer bushing stud and an extending portion connected to said base portion and engaging said first facing surface of said plurality of resistors;

a plurality of self-compressing spring members, each of said spring members having a pair of spring arms disposed about said common electrode and at least one of said plurality of resistors, said spring arms retaining said resistors in engagement with said common electrode; and an aperture formed through said base portion of said common electrode for receiving the transformer bushing stud therethrough.

8. The surge arrester of claim 7 further comprising a dielectric coating disposed about said resistors, said spring members and said extending portion of said common electrode.

9. A surge arrester comprising:

a plurality of voltage dependent, nonlinear varistors; and a self-compressing spring member retaining said varistors in a columnar relationship and having a conducting portion in continuous electrical engagement with a facing surface of at least two of said plurality of varistors and having a pair of spring arms disposed about said varistor column and supplying an axial force to said varistor column.

10. The surge arrester of claim 9 wherein said conducting portion comprises a conducting base member disposed between and engaging the facing surfaces of two of said varistors.

11. The surge arrester of claim 10 wherein said conducting portion is disposed in continuous electrical engagement with a facing surface of three varistors, said conducting portion further comprising a conducting lobe attached to said base member.

12. A surge arrester, comprising:

an arrester subassembly including a voltage dependent, nonlinear resistor and an electrode disposed against said resistor; and a self compressing spring clip having a pair of spring arms disposed about said subassembly and providing a force to retain said electrode and said resistor in contact with one another;

wherein said subassembly further includes an insulator disposed between at least one of said spring arms and said electrode, said insulator preventing conduction of current between said arms of said spring clip during steady state and during surge conditions.

13. The surge arrester of claim 12 wherein said spring arms comprise a pair of arcuate segments joined together such that said spring clip comprises a lobe.

14. The surge arrester of claim 8 wherein said spring arms include S-shaped curved segments.

15. The surge arrester of 12 wherein said spring clip includes a body portion connected between said spring arms; and wherein said insulator includes a first portion between said electrode and said spring arm and a second portion extending from said first portion and disposed between the edge of said resistor and said body portion of said spring clip.

16. A surge arrester comprising:

a plurality of arrester subassemblies; and means for retaining said subassemblies in columnar relationship, each of said subassemblies comprising:

a voltage dependent, nonlinear varistor, each of said varistors having a first and second facing surface and a current path therebetween; and a spring member having a pair of spring arms disposed about said varistor.

17. The surge arrester of claim 16 wherein said spring arms of adjacent subassemblies are interlaced, said interlaced spring arms comprising said retaining means.

18. The surge arrester of claim 17 wherein said interlaced spring arms are made of a conducting material and electrically interconnect a plurality of said facing surfaces of said varistors.

19. The surge arrester of claim 17 wherein said spring arms comprise S-shaped curved segments.

20. The surge arrester of claim 17 wherein said subassemblies further comprise electrodes disposed between said facing surfaces of said varistor and said spring arms.

21. The surge arrester of claim 20 further comprising a plurality of insulators disposed between said electrodes and said interlaced spring arms.

22. A spring clip for retaining electrical components in physical engagement, the spring clip comprising:

a base member;

a first and a second spring arm attached to said base member;

wherein said first spring arm includes a first end attached to said base member and a second end forming a first contact surface spaced apart from said base member a first predetermined distance, said first spring arm adapted for supplying a compressive force in a direction substantially perpendicular to said base member for retaining an electrical component between said base member and said first contact surface; and wherein said second spring arm includes a first end attached to said base member and a second end forming a second contact surface spaced apart from said base member a second predetermined distance, said second Spring arm adapted for supplying a compressive force in a direction substantially perpendicular to said base member for retaining an electrical component between said base member and said second contact surface.

23. The spring clip of claim 22 wherein said first and second spring arms comprise lobes bent away from said base member in opposite directions such that said first and second contact surfaces are positioned on opposite sides of said base member.

24. The spring clip of claim 22 wherein said base member is made of a conducting material.

25. The spring clip of claim 22 wherein said base member and said spring arms are integrally formed from a single piece of material.

26. The spring clip of claim 22 wherein said base member includes a tab extending therefrom, said tab forming a spade connector.

27. The spring clip of claim 22 wherein said first predetermined distance is approximately the same as said second predetermined distance.

28. The spring clip of claim 22 wherein said first predetermined distance is approximately twice said second predetermined distance.

29. A surge arrester, comprising:

an arrester subassembly including a voltage dependent, nonlinear resistor and an electrode disposed against said resistor;

a self compressing spring clip having a pair of spring arms disposed about said subassembly and providing a force to retain said electrode and said resistor in contact with one another; and a dielectric coating substantially enveloping said spring clip, said electrode and said resistor.

30. The surge arrester of claim 29 wherein said resistor has a nonlinear exponent within the range of approximately 10 to 20 and wherein said arrester has a High-Current-Short-Duration capability of approximately 40,000 amps or more.

31. The surge arrester of claim 29 wherein said spring clip provides a spring force of approximately two pounds or more.

32. The surge arrester of claim 29 wherein said dielectric coating comprises an epoxy.

33. The surge arrester of claim 29 further comprising a dielectric material disposed on at least one of said spring arms to insulate said spring arm from said electrode.

34. The surge arrester of claim 29 wherein said spring clip is made of a conducting material.

35. The surge arrester of claim 34 wherein at least one of said spring arms includes a tab extending from said spring arm, said tab forming a spade connector.

36. A surge arrester comprising:

a first electrode;

a second electrode;

a voltage dependent, nonlinear resistor having first and second facing surfaces and a current ruth therebetween, wherein said first facing surface is in contact with said first electrode and said second facing surface is in contact with said second electrode, said electrodes and said resistor comprising an arrester subassembly;

a self-compressing clip member retaining said electrodes in contact with said facing surfaces of said resistor;

means for connecting conducting leads to said electrodes; and a dielectric coating disposed about said arrester subassembly and said clip member.

37. The surge arrester of claim 36 wherein said arrester has a High-Current-Short-Duration capability of at least approximately 40,000 amps.

38. The surge arrester of claim 36 wherein said resistor comprises a metal oxide varistor having an exponent not less than 10.

39. The surge arrester of claim 36 wherein said connecting means comprises:

a conducting member extending from at least one of said electrodes; and an electrical terminal connected to said conducting member.

40. The surge arrester of claim 39 wherein said electrode, said conducting member and said electrical terminal are integrally formed from a single piece of conducting material.

41. The surge arrester of claim 36 wherein said clip member comprises a first and second spring arm connected to a body portion.

42. The surge arrester of claim 41 wherein said body portion and said spring arms comprise connected arcuate segments, said arcuate segments comprising a lobe.

43. The surge arrester of claim 41 wherein said body portion comprises an arcuate segment and wherein said spring arms include S-shaped curved segments, said body portion and said spring arms comprising a lobe.

44. The surge arrester of claim 41 wherein said spring arms are formed from a conducting material and are disposed about said subassembly such that said first spring arm is adjacent said first electrode and said second spring arm is adjacent said second electrode, said arrester further comprising an insulative material disposed between at least one of said electrodes and said adjacent spring arm for preventing conduction of current between said spring arms during steady state and during surge conditions.

45. The surge arrester of claim 44 wherein said insulative material includes a first portion disposed between said electrode and said adjacent spring arm and a second portion disposed between said body portion of said clip member and the edge of said resistor.

46. The surge arrester of claim 44 wherein said connecting means comprises a spade connector extending from said spring arm and adapted for slidingly engaging an electrical terminal.

47. A surge arrester comprising:

a spring clip for retaining electrical components in a fixed relationship by applying a compressive force to said components, said spring clip comprising:

a base member;

a first and a second spring arm attached to said base member;

wherein said first spring arm includes a first end attached to said base member and a second end forming a contact surface spaced apart from said base member a first predetermined distance; and wherein said second spring arm includes a first end attached to said base member and a second end forming a contact surface spaced apart from said base member a second predetermined distance;

a first varistor disposed between said first spring arm and said base member; and a second varistor disposed between said second spring arm and said base member.

48. The surge arrester of claim 47 wherein said first and second spring arms comprise lobes bent away from said base member in opposite directions such that said first and second contact surfaces are positioned on opposite sides of said base member and wherein said varistors are substantially coaxially aligned.

49. The surge arrester of claim 47 wherein each of said varistors includes a first and a second facing surface; and wherein said first facing surface of said first and second varistors is disposed toward said base member and wherein said second facing surface of said first and second varistors is disposed away from said base member, said arrester further comprising:

an electrode disposed about said second facing surface of each of said first and second varistors.

50. The surge arrester of claim 49 further comprising an insulator disposed between at least one of said spring arms and one of said electrodes.

51. The surge arrester of claim 47 wherein each of said varistors includes a first and second facing surface; and wherein said first facing surface of said first and second varistors electrically engage said base member; and wherein said base member is made of a conducting material.

52. The surge arrester of claim 51 wherein said base member includes a means for connecting a conducting lead to said base member.

53. The surge arrester of claim 51 further comprising;

an electrode disposed about said second facing surface of each of said first and second varistors.

54. The surge arrester of claim 47 further comprising a third varistor disposed between said second spring arm and said base member and substantially coaxially aligned with said second varistor.

55. The surge arrester of claim 54 wherein each of said varistors includes a first and a second facing surface, and wherein said spring clip comprises a common electrode electrically interconnecting a facing surface of each of said varistors.

56. The surge arrester of claim 54 wherein each of said varistors includes a first and a second facing surface; and wherein said first facing surface of said varistors is disposed toward said base member and wherein said second facing surface of said varistors is disposed away from said base member, said arrester further comprising:

a first electrode disposed about said second facing surface of said first varistor;

a second electrode disposed about said second facing surface of said second varistor;

a third electrode disposed about said first facing surface of said third varistor; and an insulator disposed between said second and said third electrodes.

57. The surge arrester of claim 56 wherein said first facing surface of each of said first and second varistors electrically engage said base member; and wherein said base member is made of a conducting material.

58. The surge arrester of claim 57 further comprising means for connecting conducting leads to said base member and to said electrodes.

59. The surge arrester of claim 57 further comprising:

a fourth electrode disposed about said second facing surface of said third varistor; and wherein said second spring arm is made of a conducting material and electrically interconnects said base member and said fourth electrode.

* * * * *